3,553,195
PROCESS FOR THE INHIBITION OF GRANULAR STARCH BASES
Wadym Jarowenko, Plainfield, N.J., assignor to National Starch and Chemical Corporation, New York, N.Y., a corporation of Delaware
No Drawing. Filed Sept. 3, 1968, Ser. No. 757,085
Int. Cl. C08b *19/02*
U.S. Cl. 260—233.5                4 Claims

ABSTRACT OF THE DISCLOSURE

A process for the preparation of inhibited, intact granule starch products which comprises the reaction, in aqueous media, of a starch base and a tripolyphosphate salt. The thus produced inhibited starches display utility as thickening agents for food products and in various sizing, coating and adhesive applications.

---

It is the object of this invention to provide a simplified, effective process for the preparation of inhibited, intact granule starch products. Various other objects and advantage of this invention will become apparent from the following description thereof.

In my use of the term "inhibited starch," I refer to a starch in which the disintegration of the starch granules is retarded under conditions where the intact starch granules would ordinarily swell and burst. Thus, inhibited starches exhibit a markedly reduced tendency to gelatinize and also display a comparatively short, noncohesive consistency after cooking. The degree of inhibition can often be controlled and varied over a wide range so as to produce starch products in which the swelling of the granules is only slightly retarded, and through successive stages in which the swelling of the granules is so highly retarded or inhibited that they cannot remain suspended in water but will, rather, settle out as a separate phase.

Starch may be inhibited, while in granular form, by reaction with polyfunctional reagents, such as di-epoxides and dianhydrides, etc., which crosslink the starch molecules within the granule. This reaction results in the formation of chemical linkages between the molecules, thereby adding to the bonding forces which hold the granule together. This increase in the strength of the cohesive forces in the granule thus results in the need for a greater energy requirement in order to disrupt the granule upon cooking such inhibited starches in water.

Inhibited granular starches are desired for various industrial uses. They are particularly useful in applications where the cohesiveness and stringiness of native starches are found to be objectionable. Thus, for example, in the food industry starch products which on cooking yield short, smooth pastes are used as thickening agents in pies, sauces, and soups, etc.

I have now discovered a process for inhibiting granular starch bases which involves the reaction, in an aqueous medium and in the presence of an alkaline reagent and a neutral salt, of a granular starch base with an alkali metal tripolyphosphate salt. Such an inhibition procedure which is conducted solely in an aqueous medium is unique and quite unexpected especially in view of the prior art in this area. Thus, although it has been known to react, under appropriate conditions, inorganic tripolyphosphate salts with starch (see U.S. Pats. 2,884,413 and 3,132,066) thereby obtaining proportionate amounts of non-crosslinked starch phosphate esters, such phosphorylation has always been achieved by means of reaction involving the application of heat to dry mixtures of the starch and phosphate salt. For example, a typical procedure would involve mixing an aqueous starch slurry with the phosphate salt, reducing the moisture content of the starch mix and then heat-treating the starch-phosphate salt mixture at temperatures of from about 100 to 160° C. Moreover, these prior art processes have all emphasized the fact that the creation of the starch phosphate ester occurs almost entirely during the dry-heating phase of their respective techniques and that mere treatment of the starch with a tripolyphosphate salt in aqueous solution does not materially alter the characteristics of the starch base. It is, thus, seen that the novel process of this invention enables the practitioner to avoid the multi-step procedures of the prior art and, for the first time, permits the effective preparation of inhibited starches by means of a reaction with a tripolyphosphate salt in an aqueous system.

The applicable starch base materials that may be used in the novel inhibition procedure of this invention must be in intact granule form. They may be derived from any plant source including corn, potato, sweet potato, wheat, rice, sago, tapioca, waxy maize, sorghum, high amylose corn or the like. Also applicable are the conversion products derived from any of the latter bases including, for example, granular, thin boiling starches prepared by the hydrolytic action of acid; oxidized starches prepared by treatments with oxidants such as sodium hypochlorite; and, any other granular starches. It is also possible, in this process, to employ any substituted ether or ester derivative of the latter starch bases, provided that such ester or ether derivatives still retain free hydroxyl groups which are available for further reaction. My use of the term "starch base" is thus seen to include any amylaceous substances, whether untreated or chemically modified, which are in granule form and which still retain free hydroxyl groups capable of entering into the crosslinking reactions utilized in the process of this invention.

As previously indicated, the essential reagents in the inhibition procedure of this invention include the alkali metal tripolyphosphate salt, the alkaline reagent and the natural salt. All alkali metal tripolyphosphate salts such, for example, as sodium and potassium tripolyphosphate are applicable for use in the novel process of this invention with sodium tripolyphosphate being the preferred inhibition reagent.

The presence of the alkaline reagent is required in order to place and maintain the reaction system at the desired pH level. The latter pH level should range from about 9.5 to 11.5, and should preferably be at a level of 10.5, in view of the fact that little, if any, inhibition of the starch granules occurs when the pH level of the system falls outside this specified range. Furthermore, the use of pH levels exceeding about 11.5 results in the alkaline degradation of the starch base as well as in the hydrolysis of some chemical bonds which have been formed; these effects being characterized by the loss of crosslinking efficiency. Representative of the alkaline reagents which are applicable for use in the process of this invention are: alkali metal hydroxides, alkali metal carbonates, alkali metal borates, alkaline-earth hydroxides, alkaline-earth carbonates, tertiary amines and quaternary ammonium bases.

The presence of a neutral salt in the reaction system is also required in order to achieve effective inhibition of the starch bases. The mechanism by which these salts assist in the inhibition reaction is not clearly understood although some of them are known to act as swelling promoters and others as swelling suppressants. Among the applicable neutral salts are included: alkali metal halides, alkali metal sulfates, alkali metal nitrates, alkali metal sulfites, alkali metal nitrites, alkali metal thiocyanates, alkaline-earth halides, alkaline-earth sulfates, alkaline-earth nitrates, alkaline-earth sulfites, alkaline-earth nitrites, and alkali metal salts of organic acids such as sodium citrate, sodium tartarate and sodium salicylate. Optimum results are, however, obtained by the use of sodium sulfate or sodium chloride. Thus, for purposes of this invention, the term "neutral salt" is meant to include salts of alkali metals and alkaline-earth metals which dissolve to give substantially neutral aqueous solutions.

In general, the novel process of this invention involves suspending the starch base in an aqueous solution containing the alkaline reagent and the neutral salt dissolved therein. The inhibition reaction is then conducted at temperatures ranging from about 20 to 60° C. for a period of about 4 to 24 hours. The use of temperatures exceeding about 60° C. is undesirable because of the need for higher concentrations of swelling suppressing salts to avoid granule swelling and filtration difficulties which result from the use of such elevated temperatures. As previously indicated, the pH level of the reaction system should range from about 9.5 to 11.5 in order to achieve maximum inhibition. Subsequent to the inhibition reaction, the starch suspension is adjusted to a pH level of from about 5.0 to 6.5 by the addition of dilute acid and the resulting reaction product thereupon filtered, washed free from salts and finally dried.

With respect to proportions, the alkali metal tripolyphosphate salt should be present in the reaction system in a concentration ranging from about 0.2 to 10%, by weight of the starch base present therein, while the neutral salt should be present in a concentration ranging from about 5 to 40%, and preferably 15%, by weight of the starch base present therein. Needless to say, the alkaline reagent is to be used in a concentration sufficient to maintain the pH of the system at the desired level.

The exact nature of the crosslinking moiety in the resulting inhibited starch product is not readily determinable in view of the complex configuration of the inhibited products as well as the lack of analytical methods and apparatus which are sufficiently sophisticated in order to make the latter determination. It is reasonable to assume, however, that the inhibition occurs by means of a distarch phosphate formation.

The inhibited, granular starch products resulting from the novel process of this invention may show varying degrees of inhibition depending upon the extent of the reaction and the consequent number of resulting crosslinkages. The amount of granule inhibition may be determined by performing a sediment volume test. In the latter procedure, an aqueous dispersion of the inhibited product having a concentration of 0.5%, by weight, solids is cooked on a boiling water bath for about 20 minutes. The cooked dispersion is then allowed to stand in a graduated vessel, such as a 100 ml. graduated cylinder, at room temperature for a period of about 16 hours. The thus cooked product will proceed to separate into layers on the basis of its relative inhibition. In extreme cases, it will completely settle out with the sediment so formed occupying different volumes depending upon the degree of inhibition of the reaction product. These sediments constitute insoluble granules of the starch derivative whose swollen volumes are relative to the degree of inhibition of the derivatives. Thus, because of their lower swelling and hydration capacity, the more inhibited, i.e., the more crosslinked, products will yield smaller sediment volumes than correspondingly less inhibited products. Where, however, the original starch base, e.g., potato starch, exhibits no sediment formation because of the completely swollen, highly hydrated and/or disrupted nature of its granules, inhibition in the crosslinked product will be evidenced by the subsequent formation of sediment. This result is directly attributable to the toughened state of the crosslinked granules.

The viscosity of the cooked pastes derived from these inhibited starch products may also be used to determine their inhibition characteristics. A Brabender Viscograph is typical of the apparatus usually utilized to make such viscosity determinations. This instrument traces a continuous graph record of the viscosity of the test sample, thereby providing viscosity data during the heating, holding and cooling cycles. Thus, for example, uninhibited starch products will exhibit relatively high peak viscosities during the heating cycle and relatively large viscosity decreases during a holding cycle, e.g., when maintained for 10 minutes at 95° C. Furthermore, lightly inhibited starches also exhibit high peak viscosities but do not show the marked viscosity decrease during the holding period which is characteristic of the uninhibited starch product. On the other hand, moderately inhibited products do not exhibit any peak viscosities but do undergo viscosity increases during the holding period.

The inhibited starch products resulting from the novel process of this invention can be utilized in many applications. Thus, in the food industry they can be used as thickening agents for pies, sauces and soups, etc. They are also applicable for use in various sizing, coatings and adhesive applications. In addition, these inhibited starches may be used as dusting powders for surgical and cosmetic purposes, etc.

The following examples will further illustrate the embodiment of this invention. In these examples, all parts given are by weight unless otherwise noted.

EXAMPLE I

This example illustrates the preparation of inhibited granular starch products by means of the novel procedure of this invention.

A reaction vessel fitted with means for mechanical agitation was charged with 125 parts of water, 1.5 parts of sodium tripolyphosphate and 15 parts of sodium sulfate. While the resulting solution was under agitation, 100 parts of a waxy maize starch were suspended therein. The pH of the starch suspension was then adjusted to a level of 11.0 by the addition of 0.8 parts of sodium hydroxide. The temperature of the system was raised to 37° C. whereupon the inhibition reaction was allowed to proceed for a period of 17 hours. Thereafter the resulting slurry was adjusted to a pH level of 5.0, filtered, washed and dried. The inhibited product thus obtained was found to have maintained its original granular form.

The Sediment Volume Test, as previously described, was utilized to determine the degree of inhibition of the resulting starch product. In order to show comparative values, the cookability of the raw waxy maize starch was also determined by this method. Thus, the waxy maize starch base exhibited a sediment volume of 90 milliliters in contrast to the 12 milliliter sediment volume of the inhibited starch reaction product.

The degree of inhibition of the resulting inhibited starch product was further evaluated by means of a viscosity determination conducted with a Brabender Viscograph. Thus, 23 parts of the above prepared inhibited starch were admixed with 50 parts of a citrate buffer (a 3:2 mixture of 1 molar citric acid and 0.29 molar sodium citrate) and sufficient distilled water so as to have a total of 460 parts in the system. The temperature of the system was then increased at a rate of 1.5° C. per minute until a temperature of 95° C. was attained; the latter level then being maintained for a period of 10 minutes. The viscosity, in Brabender Units (BU), was recorded on a continuous chart and was compared with another chart which reflected the viscosity characteristics of the base starch which, in this instance, was a waxy maize starch which had been submitted to a similar heat treatment.

As previously stated, inhibition of the starch products of this invention, under the stated conditions, is generally reflected by a moderate peak viscosity and minimum degradation during the heating cycle as contrasted with the higher peak viscosities and the substantially greater degradation during the heating cycle which is exhibited by the base starches. Thus, the following viscosity readings were obtained by means of the above described procedure,

| Starch product | Peak viscosity (BU) | Viscosity (BU) after 10 min. at 95° C. |
|---|---|---|
| Inhibited waxy maize | 750 | 750 |
| Waxy maize base | 1,000 | 300 |

The data summarized above clearly illustrates the effectiveness of the novel process of this invention as a means for inhibiting granular starches.

EXAMPLE II

This example further illustrates the novel inhibition procedure of this invention utilizing a variety of reactants at different concentration levels and under varying reaction conditions.

The general procedure utilized to prepare the products of this example was identical to the procedure as described in Example I, hereinabove. In all instances, 0.8 part of sodium hydroxide were added to the system in order to maintain the pH level thereof within the specified range.

The following tables list the starch bases, the components of the respective reaction systems and the reaction conditions utilized. It further presents a comparison of the degree of inhibition of the resulting reaction products as contrasted with that of the starch bases from which they were respectively derived.

| | Parts | |
|---|---|---|
| Waxy maize starch | 100 | 100 |
| Sodium tripolyphosphate | 1 | 1 |
| Sodium sulfate | 15 | -- |
| Reaction temperature (° C.) | 37 | 40 |
| Total reaction time (hrs.) | 17 | 17 |
| pH of reaction system | 11.0 | 10.5 |
| Sediment volume (ml.) | 2 | 38 |

The results summarized above clearly indicate the increased inhibition efficiency resulting from the presence of a neutral salt in the inhibition reaction system of this invention.

EXAMPLE IV

This example illustrates the necessity for maintaining the reaction system within the desired pH range specified herein in order to achieve effective inhibtion by means of the process of this invention.

Thus, inhibited starch products were prepared, at different pH levels, utilizing the reactants and the reaction condition listed hereinbelow in the general inhibition procedure set forth in Example I. The pH level of the various systems was varied by adding appropriate amounts of dilute aqueous solutions of either hydrochloric acid or sodium hydroxide.

| | Parts | | | | | | | |
|---|---|---|---|---|---|---|---|---|
| Formulation Number | 1 | 2 | 3 | 4 | 5 | 6 | 7 | 8 |
| Corn starch | 100 | 100 | 100 | | | | | |
| Waxy maize starch | | | | 100 | 100 | | 100 | 100 |
| A high amylose corn starch containing 70%, by seight of amylose | | | | | | 100 | | |
| Sodium tripolyphosphate | 3 | 3 | 3 | 1 | 10 | 1 | 0.5 | 0.5 |
| Sodium sulfate | 5 | 10 | 20 | 15 | 40 | 30 | | |
| Sodium nitrate | | | | | | | 10 | |
| Sodium chloride | | | | | | | | 10 |
| Water | 125 | 125 | 125 | 125 | 125 | 125 | 125 | 125 |
| Reaction temperature (° C.) | 40 | 40 | 40 | 37 | 40 | 23 | 23 | 23 |
| Total reaction time (hrs.) | 16 | 16 | 16 | 17 | 7 | 16 | 16 | 16 |
| pH of reaction system | 10.9 | 10.8 | 10.5 | 11.0 | 10.5 | 10.5 | 9.6 | 9.6 |
| Sediment volume of inhibited product (ml.) | 14 | 9 | 9 | 12 | 13 | 5 | 13 | 14 |
| Sediment volume of starch base (ml.) | 35 | 35 | 35 | 90 | 90 | 9 | 90 | 90 |
| Peak viscosity (BU) (inhibited) | | | | 1,740 | | | 980 | |
| Viscosity (BU) after 10 min. at 95° C. (product) | | | | 1,460 | | | 920 | |
| Peak viscosity (BU) (starch) | | | | 1,000 | | | 1,000 | |
| Viscosity (BU) after 10 min. at 95° C. (base) | | | | 300 | | | 300 | |

| | Parts | | | | | | |
|---|---|---|---|---|---|---|---|
| Formulation Number | 9 | 10 | 11 | 12 | 13 | 14 | 15 |
| Waxy maize starch | 100 | 100 | 100 | 100 | 100 | 100 | 100 |
| Sodium hydroxide | | | | | | 4 | 4 |
| Sodium tripolyphosphate | 0.5 | 0.5 | 0.5 | 1 | 1 | 1 | 5 |
| Sodium sulfate | | | | 30 | | 40 | 40 |
| Sodium nitrate | 10 | | | | | | |
| Sodium thiocyanate | | 10 | | | | | |
| Sodium salicylate | | | 10 | | | | |
| Water | 125 | 125 | 125 | 125 | 125 | 125 | 125 |
| Triethylamine | | | | 2.0 | | | |
| Calcium carbonate | | | | | 20 | | |
| Reaction temperature (0° C.) | 23 | 23 | 23 | 40 | 40 | 23 | 23 |
| Total reaction time (hrs.) | 16 | 16 | 16 | 16 | 16 | 16 | 16 |
| pH of reaction system | 9.6 | 9.6 | 9.6 | 10.6 | 11.1 | 11.4 | 11.3 |
| Sediment volume of inhibited product (ml.) | 13.5 | 15 | 11 | 11 | 8 | 18 | 8 |
| Sediment volume of starch base (ml.) | 90 | 90 | 90 | 90 | 90 | 90 | 90 |
| Peak viscosity (BU) (inhibited) | | | | 1,410 | | | |
| Viscosity (BU) after 10 mins. at 95° C. (product) | | | | 1,170 | | | |
| Peak viscosity (BU) (starch) | | | | 1,000 | | | |
| Viscosity (BU) after 10 mins. at 95° C. (base) | | | | 300 | | | |

The results summarized above clearly indicate the effectiveness of the novel inhibition process of this invention in the utilization of a wide range of reagents and reaction conditions.

EXAMPLE III

This example illustrates the necessity of having a neutral salt present in the reaction system in order to achieve starch inhibition.

The general procedure utilized to prepare the inhibited products of this example was identical to the procedure described in Example I, hereinabove. The following table lists the specific reaction systems which were utilized as well as the degree of inhibition which was achieved.

Waxy maize starch—100 parts
Sodium tripolyphosphate—1 part
Soldium sulfate—30 parts
Reaction temperature—40° C.
Total reaction time—16 hours The degree of the inhibition of the resulting reaction products was then determined by means of the sediment volume test.

| pH Level of system: | Sediment volume (ml.) |
|---|---|
| 2.0 | None |
| 8.0 | None |
| 9.5 | 20.0 |
| 10.5 | 11.0 |
| 11.4 | 16.0 |

The data summarized above thus clearly points up the necessity for conducting the novel inhibition procedure of this invention within the designated pH range of from about 9.5 to 11.5.

Summarizing, it is thus seen that this invention provides a unique method for the preparation of inhibited granular starch products.

Variations may be made in proportions, procedures and materials without departing from the scope of this invention which is defined by the following claims.

I claim:

1. A process for the preparation of inhibited, intact granule starch-phosphate reaction products, said process comprising the reaction, in an aqueous medium having an alkaline reagent and a neutral salt dissolved therein, between an intact granule starch base and an alkali metal tripolyphosphate salt; said alkaline reagent being a reagent capable of maintaining the pH of said reaction system in the range of about from 9.5 to 11.5 and being selected from the class consisting of alkali metal hydroxides, alkali metal carbonates, alkali metal borates, alkaline-earth hydroxides, alkaline-earth carbonates, tertiary amines and quaternary ammonium bases, and said neutral salt being a salt which will dissolve in water to yield a substantially neutral aqueous solution, said salt being selected from the class consisting of alkali metal halides, alkali metal sulfates, alkali metal nitrates, alkali metal sulfites, alkali metal nitrites, alkali metal thiocyanates, alkaline-earth halides, alkaline-earth sulfates, alkaline-earth nitrates, alkaline-earth sulfites, alkaline-earth nitrites and alkali metal salts of organic acids.

2. The process of claim 1, wherein said reaction is conducted at a temperature in the range of from about 20 to 60° C. and for a period of from about 4 to 24 hours.

3. The process of claim 1, wherein subsequent to said reaction, the aqueous suspension thereby obtained is adjusted to a pH in the range of from about 5.0 to 6.5 by the addition of dilute acid; the resulting starch-phosphate reaction product which is present in said suspension thereupon being recovered by filtration, washed free from salts and finally dried.

4. The process of claim 1, wherein said alkali metal tripolyphosphate salt is present in the reaction system in a concentration of from about 0.2 to 10% and said neutral salt is present in a concentration of from about 5 to 40%; each of the latter concentrations being based upon the weight of said starch base which is present in the system.

References Cited

UNITED STATES PATENTS

| | | | |
|---|---|---|---|
| 2,884,413 | 4/1959 | Kerr et al. | 260—233.5 |
| 3,132,066 | 5/1964 | Kerr et al. | 260—233.5 |
| 3,136,646 | 6/1964 | Elizer et al. | 106—210 |
| 3,238,193 | 5/1966 | Tuschhoff et al. | 260—233.5 |
| 3,378,546 | 4/1968 | Tsuzuki | 260—233.3 |

M. J. WELSH, Primary Examiner

M. I. MARQUIS, Assistant Examiner

U.S. Cl. X.R.

99—92, 124, 144; 260—219, 233.3